Patented Oct. 7, 1941

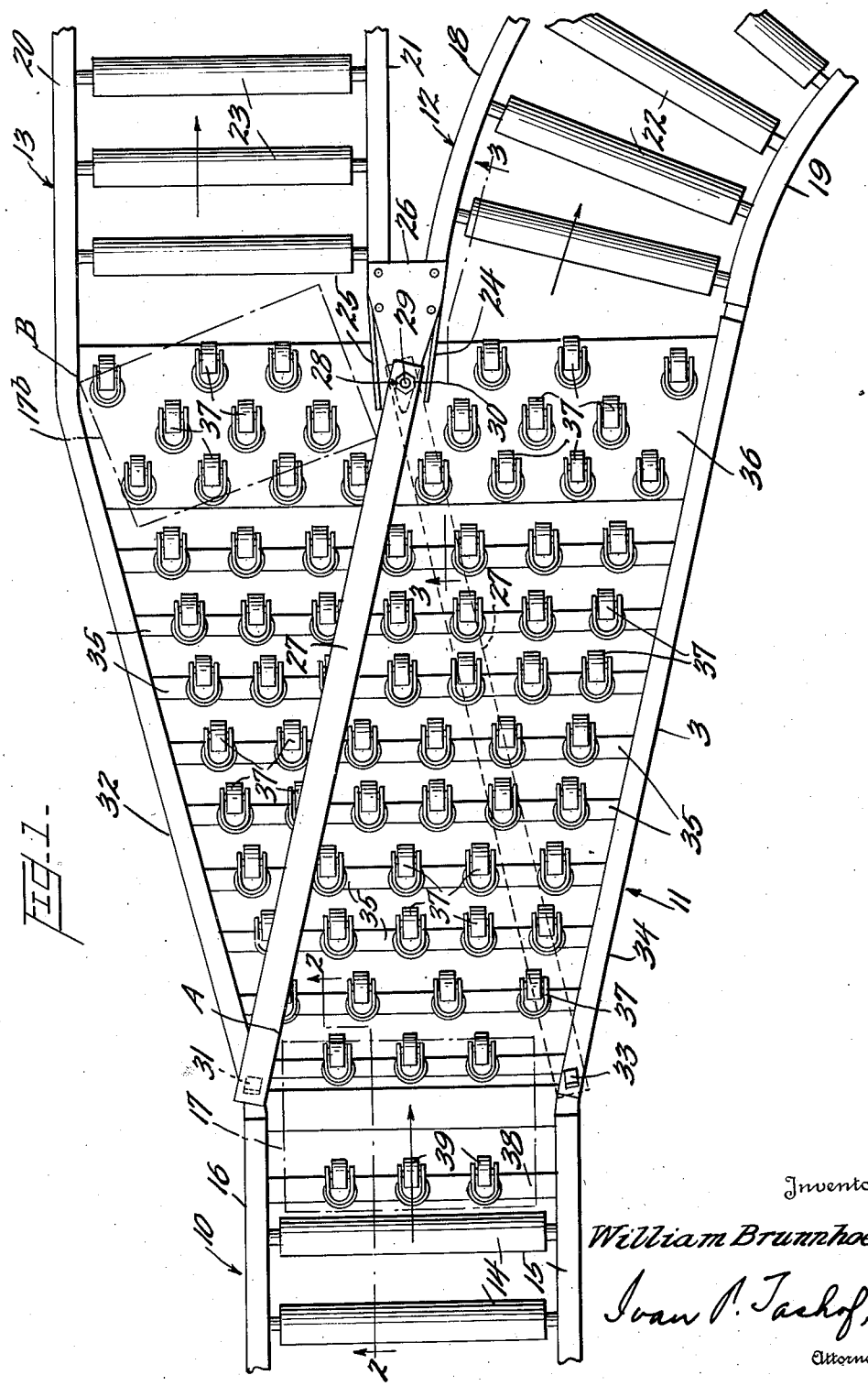

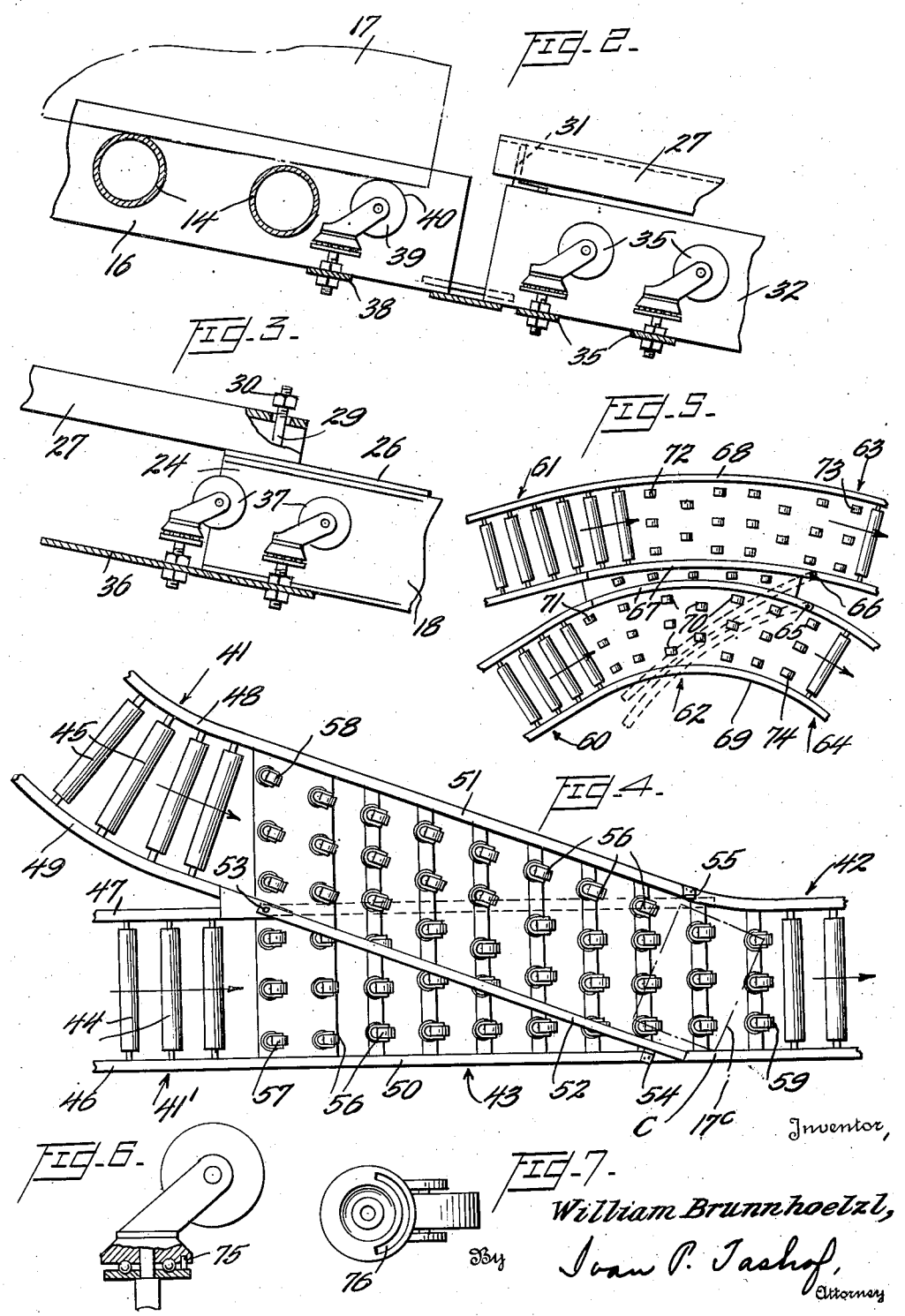

2,257,937

UNITED STATES PATENT OFFICE 2,257,937

DEVICE FOR CONVEYING PACKAGES

William Brunnhoelzl, Brooklyn, N. Y.

Application March 8, 1940, Serial No. 323,032

18 Claims. (Cl. 193—36)

The present invention relates to a conveyor system. More particularly, the present invention relates to a conveyor system, either of the gravity or power operated type, including a plurality of conveyors, feeding into one another, and a switching conveyor portion which is adapted to switch packages from one conveyor section into the other conveyor section, without hindering the free movement thereof through the system.

Various means have been provided in the prior art for transferring packages from one conveyor to another. These conveyors have been provided with various types of rollers or package supporting means and with guiding means. However, one of the difficulties encountered during the switching of packages from one conveyor to another, or selectively from a group of conveyors to another group and/or conveyor, is the jamming action encountered during the change in direction of the packages. This is particularly true where the packages are relatively bulky, and where the conveyor is of the gravity operated type. It is one of the objects of the present invention, therefore, to provide, in a conveyor system, a switching or transfer arrangement which will change the direction of packages and selectively guide the same from feeding conveyor means into receiving conveyor means, without hindering the free movement of the packages over the system.

Another object of the present invention is to provide a conveyor system, including feed conveyor means, receiving conveyor means, and supporting means for the packages associated both with the switching section of the conveyor system, with the feeding conveyor means, and the receiving conveyor means, so that the packages will be supported during directional changes.

A third object of the present invention is to provide supporting means in a conveyor switching means that is positioned to carry the entire weight of the package during directional movement changes, and that is capable of allowing both forward movement and rotating movement of the packages during such change.

A fourth object of the present invention is to provide in a conveyor system package supporting means movable in a fixed direction, a guide member, which is adapted to change the direction of movement of the packages, and a second package supporting means which is movable in a plurality of direction and which is so positioned in the conveyor system that the packages will be substantially completely supported by the package supporting means during directional changes.

A fifth object of the present invention is to provide in a roller way system, which consists of a plurality of roller ways feeding into one another, a switching means comprising a guide rail adapted to change the direction of package movement, and direct the package from one roller way into another, together with a plurality of caster supporting means, capable of supporting the entire weight of the package during the guiding action.

A sixth object of the present invention is to provide caster supporting means for packages undergoing directional change which is capable of lifting the package from the normal movable support so as to prevent retardation of directional change of the package.

Referring to the drawings forming part of the present specification:

Fig. 1 is a plan view of a conveyor system embodying the present invention;

Fig. 2 is a section taken along the line 2—2 of Fig. 1;

Fig. 3 is a section taken along the line 3—3 of Fig. 1;

Fig. 4 is a plan view of a modified conveyor system;

Fig. 5 is a more or less diagrammatic plan view of a third modification, illustrating the present invention;

Fig. 6 is a detail partly in section of the specific caster construction;

Fig. 7 is a bottom plan view of the upper caster member showing the groove therein.

Referring to Fig. 1, a feed roller way is indicated in general at 10, a switching conveyor portion is indicated in general at 11, and a pair of receiving roller ways is indicated in general at 12 and 13. The feed roller way is provided with rotatably mounted rolls or package supporting means 14, which are suitably journalled in the side rail members 15 and 16 for rotatable movement.

It is to be understood that the width of the roller way will depend largely on the size and type of package to be transported thereover, and that the roller way is suitable inclined so that the force of gravity will move the packages in the direction of the arrows in Fig. 1.

A package moving over the roller way is indicated diagrammatically in dotted lines at 17. The receiving roller ways 12 and 13 are similarly provided with side rails 18—19 and 20—21 respectively, the side rails serving to support the rolls 22, of the receiving roller way 12, and the rolls 23 of the receiving roller way 13. Preferably the side rails in each instance, consist of U-shaped channel members having the flanges thereof facing outwardly of the conveyor so as to present a smooth surface for the guidance of packages moving over the roller way, although other side members may be employed as is well known in the art.

The side rails 18 and 21 have their web or inner portions extended as shown at 24 and 25, so as to overlap the switching portion of the conveyor system. This functions as an additional guiding means for the packages being transferred from the switching portion 11, to the receiving conveyor portions 12 and 13.

Mounted between the two receiving conveyors 12 and 13, as for example on a suitable plate 26, fastened to the side rails 18 and 21, is a guide rail member 27. The guide rail member 27 is pivoted at 28 in such a manner as to be capable not only of pivotal movement, but also of a lifting action. As shown, particularly in Fig. 3, the guide rail 27 is carried on a bolt 29. The bolt is in turn carried by the plate 26 and is provided with a nut 30, which during normal positioning, is spaced from the guide rail 27 so as to permit the lifting action hereinbefore described. The guide rail 27 preferably consists of a channel member, mounted on the bolt 29 so that the side flanges thereof depend downwardly. The side flanges of the channel are adapted, therefore, to cooperate with a positioning member or angle 31 carried by the side rail 32 of the switching conveyor portion 11.

As shown in Fig. 2, the guide rail 27 has its side flanges positioned to each side of the member 31. This fixes the position of the guide rail, as shown in Fig. 1. The guide rail 27 may be manually moved to cooperate with the member 33 in a similar manner, and when in this position will serve to guide packages into the receiving conveyor 13, instead of the receiving conveyor 12.

The member 33 is mounted on the side rail 34 of the switching conveyor portion in a manner similar to the mounting of the member 31 on the rail 32.

The switching conveyor portion 11 is also provided with a plurality of transversely extending bars 35 and a plate 36. The bars 35 and the plate 36 serve as supporting means for a plurality of swivel casters 37. The casters 37 as shown in Fig. 1 are relatively closely spaced over the entire surface of the switching portion. As shown in Fig. 1, the feeding roller way 10 is also provided with a cross bar 38. This bar serves to support additional casters 39. The casters are suitably swivelled as shown in Figs. 2 and 3, and may be bolted or otherwise suitably mounted on the transverse bars 35—38 and the plate 36.

The casters are preferably so positioned that their supporting surface or periphery 40 is at a higher level than the rolls 14, 22 and 23 for a purpose to be hereinafter described. Preferably the casters are of a frictionless type and may be provided with suitable ball bearings or other mountings. They are proportioned and spaced in accordance with the type and size of package to be transferred. Where the roller ways and casters are used for the switching and transport of beer cases, they are preferably spaced approximately 4 inches apart and their peripheries are preferably at ⅛ inch higher than the periphery of the rollers. The difference between the height of the peripheries of the casters and that of the rollers, is preferably such that the packages will be given a lifting action so as to completely clear the surface of the rollers and to take care of any surface irregularities or differences in surface of the rollers while preventing stoppage of the packages during shifting action from the rollers to the casters. In other words, if the uppermost periphery of the caster surface is at too great a height above the roller surface, the packages will be retarded in movement from the rollers to the casters and if the uppermost surface of the casters is at too low a level, they will not exert a lifting action on the boxes during the transfer and guidance thereof into the receiving conveyor portions 12 and 13.

Stated differently, the caster supporting surface functions to lift the packages above the level of the adjacent conveyor so as to prevent any retardation of the turning movement of the packages by contact with the adjacent conveyor. Preferably the amount of lifting action is only limited by the resistance encountered by the package in moving from the rolls or other non-turnable conveying means to the casters. Although the difference in height between the rolls and the casters is given as ⅛" it is to be understood that this is merely by way of example and not limiting. The preferred difference will depend on the size and weight of the packages, the frictional resistance of the casters, and the pitch of the conveyors feeding onto the casters, etc.

The provision of additional swivel casters 39 in the feeding roller way 10 is of the utmost importance since it is necessary that the rear end of the package be entirely supported on the casters, prior to or simultaneously with the guiding action of the guide rail 27.

Referring to Fig. 1, it will be noted that the package 17 will strike the guide rail 27 at the point indicated at A. The package will then be given a turning movement so as to swing it into alignment with the receiving conveyor 12. At the point when the forward end of the package strikes the guide rail, it is necessary that the rearward end of the package be supported on the casters 39. If the casters were not present and a roll such as the rolls 14 substituted therefor, it is obvious that when the package strikes the point A, a portion of the weight of the package would be supported on the roll and the turning movement of the package would be prevented or greatly retarded.

Obviously the number of casters located within the portion of the feeding conveyor which is adjacent the switching conveyor and the positioning thereof will depend to some extent on the size of the package and the point at which the package strikes the guide rail 27, i. e., the location of point A.

A relatively wide plate 36 is provided so that additional casters may be positioned thereon. Thus, the last row of casters shown to the right of Fig. 1 may be considered as positioned within the receiving conveyor portions 12 and 13, rather than in the switching conveyor portions 11 since they are positioned within the compass of the guiding members 24 and 25. Thus, a package which is indicated in dotted lines at 17b in Fig. 1 will be completely supported on casters when one of the forward edges thereof strikes the guide rail 20 at point B. Here again the use of casters within the portion of the receiving conveyor which is adjacent the switching conveyor section permits the free change of direction of the package 17b and it is highly important that the entire weight of the package be supported on swivel casters rather than on a relatively fixed supporting means, such as the rolls 23.

Although the device has been described in connection with a gravity conveyor or roller way, it is obvious that the invention is applicable to power driven conveyer systems, employing moving belts and the like, since here again the normal supporting surface is incapable of multi-directional movement, as is the supporting means embodied in the casters shown and described in connection with the present invention.

In a modification of the present invention shown in Fig. 4, the switching means is applied to a conveyor system wherein two feed conveyor portions, indicated in general at 41 and 41', selectively feed into a receiving conveyor portion, indicated in general at 42, the transfer being effected by means of a switching conveyor portion indicated in general at 43.

The feed conveyor portions are shown provided with rolls 44 and 45, suitably journalled in the side rails 46, 47 and 48, 49 respectively for rotational movement. The switching conveyor portion is shown provided with guide side rails 50 and 51 and with a movable guide rail 52. The guide rail 52 is suitably pivoted and supported at 53. The guide rail 52 is a relatively light member and is adapted to be automatically moved by the packages entering the switching portion from the feed conveyors 41 and 41'. The pivotal movement of the guide rail 52 is limited by the stop members 54 and 55 carried by the side rails 50 and 51 respectively. As in the modification disclosed at Fig. 1, it will be noted that the switching portion is provided with casters 56 and that in addition to the casters 56 there is provided a row of casters 57 carried by the feed conveyor 41' and a row of casters 58 carried by the feed conveyor 41. There is also provided an additional row of casters 59 carried by the receiving conveyor 42.

The function of the casters 59 is to completely support and carry the weight of the package indicated at 17c at the time the edge of the package strikes the guide rail of the receiving conveyor 42; in other words, simultaneously or prior to the contact of the package and the guide rail at point C.

Obviously the casters 57 and 58 will perform a similar function in the event any changes of direction are necessary upon the packages entering the switching conveyor portion 43 from the feed conveyors 40 and 41.

In the modification disclosed in Fig. 5, the invention is shown as applied to the transfer of packages selectively from one of two substantially parallel roller ways into another. Thus, feeding roller way portions, indicated in general at 60 and 61, feed into a switching portion, indicated in general at 62, which in turn selectively guides packages into either one of receiving roller way portions indicated in general at 63 and 64. A portion of the adjacent side rails of the parallel conveyors are movable and pivoted at 65 and 66. The movable portion of the adjacent guide rail may be a single member and/or there may be a plurality of members, as indicated by the numeral 67. Suitable positioning members, similar to the members 31 and 33 of Fig. 1 are carried by the side rails 68 and 69 respectively, and may fit into hollow portions or between the flanges of the channel if the guide rail 67 is of general channel shape.

Casters 70 are provided in the switching portion and supplemental rows of casters 71, 72, 73 and 74 are provided within the feeding conveyor portions 60 and 61 and the receiving conveyor portions 63 and 64. These casters serve to support the weight of the packages during directional changes in the same manner as the supplemental casters, located within the receiving and feeding conveyor portions hereinbefore described.

In Fig. 6 there is illustrated a detail of one of the swivel casters employed in accordance with the present invention. Preferably these casters are limited to approximately 170° of angular motion. This may be effected, for example, by providing a protruding lug 75 on a bottom, immovable portion of the caster, and a cooperating groove 76 in the lower surface of an upper rotatable portion of the caster. By limiting the size of the groove, any desired amount of angular rotation may be achieved. However, it has been found that when the amount of angular rotation is limited to 170° as shown in detailed view (Fig. 7), that the caster cannot position itself at right angles and directly opposed to the direction of movement of the packages. This provision of limited angular movement for the caster aids in preventing retardation of package movement during the switching operation.

I claim:

1. In a conveyor system including a feed roller-way, a receiving roller-way, and a switching conveyor adapted to transfer packages from the feed roller-way to said receiving roller-way, means to guide the packages and change the direction of movement thereof during such transfer, means to support packages associated with such switching conveyor means, and so positioned as to completely support packages prior to the guiding action of said guiding means, said means to support packages being capable of free multi-directional movement to thereby facilitate the aforementioned directional changes.

2. In a conveyor system for packages, package supporting means movable in a fixed direction to thereby similarly move said packages, a guide member adapted to change the direction of movement of the packages moving over said system, and a second package supporting means freely movable in a plurality of directions positioned in said system to support substantially all of each package out of contact with said first mentioned supporting means prior to and during said directional change, said second package supporting means being adapted to support said packages at such a height that the packages when so supported will be free from contact with the first supporting means.

3. In a conveyor system for packages, package supporting means movable in a fixed direction to thereby similarly move said packages, a pivoted guide member adapted to change the direction of movement of the packages moving over said system, and rotatable package supporting casters having a free swivel movement and having supporting surfaces at a height above said first mentioned supporting means, positioned in said system to support substantially all of each package during said directional change and means to limit the orbit of said free swivel movement.

4. In a conveyor system including a first inclined rollerway, and a second pair of inclined rollerways communicating with the first rollerway by means of a switching conveyor portion, side rails on said first rollerway, side rails on said second rollerways each comprising a channel member having an inwardly facing web portion extending over said switching conveyor portion, swiveled casters on said switching conveyor portion and between the extended webs of said side rails, a pivot supporting plate positioned between said webs, an upwardly extending pivot on said plate, a movable guide rail having one end supported by said plate and pivot, and limiting means on the rails of said first mentioned rollerway for limiting the movement of the free end of said guide rail.

5. In a conveyor system including a first inclined rollerway, and a second pair of inclined rollerways communicating with the first rollerway by means of a switching conveyor portion, side rails on said first rollerway, side rails on said second rollerways each comprising a channel member having an inwardly facing web portion extending over said switching conveyor portion, swiveled casters having a limited turning movement, and package supporting surfaces above the supporting surfaces of said rollerways on said switching conveyor portion and between the extended webs of said side rails, a pivot supporting plate positioned between said webs, an upwardly extending pivot on said plate, a movable guide rail having one end supported by said plate and pivot, and limiting means on the rails of said first mentioned rollerway for limiting the movement of the free end of said guide rail.

6. In a conveyor system including a feed conveyor section, a receiving conveyor section and a switching conveyor section, means associated with said switching conveyor section and adapted to direct packages from said feed conveyor section to said receiving conveyor section and change the direction of movement thereof, movable means to support packages associated with said feed and receiving conveyor sections, and a second means to support packages capable of free multi-directional movement positioned within said switching conveyor section and within a substantial portion of said feed conveyor section and receiving conveyor section adjacent said switching conveyor section so that said packages are substantially supported on said second supporting means and freely movable forwardly and laterally prior to said directional change.

7. In a conveyor system including a feed conveyor section, a receiving conveyor section and a switching conveyor section, means associated with said switching conveyor section adapted to direct packages from said feed conveyor section to said receiving conveyor section and change the direction of movement thereof, movable means to support packages associated with said feed and receiving conveyor sections, and freely swiveled casters adapted to support packages associated with said switching conveyor section and with a substantial portion of said feed conveyor and receiving conveyor section adjacent said switching conveyor section so that said packages are substantially supported on said casters and freely movable forwardly and laterally prior to said directional change.

8. In a conveyor system including a feed conveyor section, a receiving conveyor section and a switching conveyor section, means associated with said switching conveyor section and adapted to direct packages from said feed conveyor section to said receiving section and change the direction of movement thereof, movable means to support packages associated with said feed and receiver conveyor sections, and a second means to support packages adapted to lift the packages above the level of the first supporting means and completely support said packages prior to directional change, said last mentioned means being associated with said switching conveyor section and with the portion of said feed conveyor section and receiving conveyor section adjacent said switching conveyor section.

9. In a conveyor system including a feed conveyor section, a receiving conveyor section, and a switching conveyor section, guide means associated with said switching conveyor section and adapted to direct packages from said feed conveyor section to said receiving conveyor section and change the direction of movement thereof, movable means to support packages associated with said feed and receiving conveyor sections, and a second means to support packages associated with said switching conveyor section and positioned to completely support said packages prior to the guiding action of said guide means, said last mentioned package supporting means being capable of free multi-directional movement to thereby facilitate the aforementioned directional changes.

10. In a conveyor system, including a feed conveyor section, a receiving conveyor section and a switching conveyor section, means associated with said switching conveyor section and adapted to direct packages from said feed conveyor section to said receiving conveyor section and change the direction of movement thereof, movable means to support packages associated with said feed and receiving conveyor sections, and rotatable package supporting casters having a free swiveled movement and associated with said switching conveyor section and with a substantial portion of said feed conveyor section and receiving conveyor section adjacent said switching conveyor section so that said packages are substantially supported on said casters and freely movable forwardly and laterally prior to said directional change, and means associated with said casters and adapted to limit the orbit of free movement thereof.

11. In a conveyor system including a feed conveyor section, a receiving conveyor section, and a switching conveyor section, guide means associated with said switching conveyor section and adapted to direct packages from said feed conveyor section to said receiving conveyor section and change the direction of movement thereof, movable means to support packages associated with said feed and receiving conveyor sections and freely rotatable package supporting casters positioned to completely support said packages prior to the guiding action of said guide means.

12. In a conveyor system, a feed conveyor section, a pair of receiving conveyor sections, and a switching conveyor section, means associated with said switching conveyor section and adapted to direct packages from said feed conveyor into either one of said receiving conveyor sections selectively and change the direction of movement of said package, movable means to support packages associated with said feed conveyor section and said receiving conveyor sections, and a second means to support packages capable of free multi-directional movement associated with said switching conveyor section and with a substantial portion of said feed conveyor section and receiving conveyor sections adjacent said switching conveyor section so that said packages are substantially supported on said second supporting means and freely movable forwardly and laterally prior to the transfer of packages from said feed conveyor section into a selected one of said receiving conveyor sections.

13. In a conveyor system, a pair of feed conveyor sections, a receiving conveyor section, and a switching conveyor section, means associated with said switching conveyor section and adapted to direct packages from either one of said feed conveyor sections into said receiving conveyor section and change the direction of movement thereof, movable means to support packages associated with said feed conveyor sections and said receiving conveyor section, and a second means to support packages capable of free multidirectional movement associated with said switching conveyor section and with a substantial portion of said feed conveyor sections and receiving conveyor section adjacent said switching conveyor section so that said packages are substantially supported on said second supporting means and freely movable forwardly and laterally prior to the transfer of packages from a selected feed conveyor section into said receiving conveyor section.

14. In a conveyor system including a feed conveyor section, a pair of receiving conveyor sections and a switching conveyor section, means adapted to direct packages from said feed conveyor section into either one of said receiving conveyor sections and change the direction of movement thereof, movable means to support packages associated with said feed and receiving conveyor sections, and a second means to support packages associated with said switching conveyor section and with a portion of said feed conveyor section and said receiving conveyor sections adjacent said switching conveyor section, said last mentioned package supporting means being adapted to lift said packages above the level of the first mentioned supporting means and completely support the same during directional change.

15. In a conveyor system including a pair of feed conveyor sections, a receiving conveyor section and a switching conveyor section, means associated with said switching conveyor section and adapted to direct packages from either one of said feed conveyor sections selectively to said receiving conveyor section and change the direction of movement thereof, movable means to support packages associated with said feed conveyor sections and said receiving conveyor section, and a second means to support packages associated with said switching conveyor section and with the portion of said feed conveyor section and receiving conveyor section adjacent said switching conveyor section, said last mentioned package supporting means being adapted to lift packages above the level of the first mentioned supporting means and completely support the same during directional change.

16. In a conveyor system including a pair of feed conveyor sections, a receiving conveyor section, and a switching conveyor section, a guide rail pivoted between the two feed conveyor sections and extending over said switching conveyor section and adapted to guide the packages and change the direction of movement thereof during transfer between the feed conveyor sections and the receiving conveyor section, movable means to support packages associated with the feed conveyor sections and the receiving conveyor section, and a second means to support packages associated with said switching conveyor section, and so positioned as to completely support said packages prior to the guiding action of said guide rail, said last mentioned package supporting means being capable of multidirectional movement to thereby facilitate the transfer of packages from a selected feed conveyor section to said receiving conveyor section.

17. In a conveyor system including a pair of feed conveyor sections, a receiving conveyor section and a switching conveyor section, a guide rail pivoted between the two feed conveyor sections to guide the packages and change the direction of movement thereof during the transfer between the feed conveyor sections and the receiving conveyor section, movable means to support packages associated with the feed conveyor sections and the receiving conveyor section, and a plurality of swiveled casters adapted to support packages associated with said switching conveyor section and so positioned as to completely support said packages prior to the guiding action of said guide rail.

18. In a conveyor system, a pair of conveyor sections having at least a portion thereof disposed in substantial concentric relation with one another, said concentrically disposed portions constituting a switching conveyor section, means associated with said switching conveyor section and adapted to direct packages from one of said first conveyor sections to the other and change the direction of movement thereof, movable means to support packages associated with said first conveyor sections, and a second means to support packages capable of free multi-directional movement associated with said switching conveyor section and with the portions of said first mentioned conveyor sections immediately adjacent said switching conveyor section to thereby facilitate the transfer of packages selectively from one of said conveyors into the other.

WILLIAM BRUNNHOELZL.